(12) United States Patent
Shinagawa et al.

(10) Patent No.: US 11,408,378 B2
(45) Date of Patent: Aug. 9, 2022

(54) EVAPORATED FUEL PROCESSING DEVICE

(71) Applicant: AISAN KOGYO KABUSHIKI KAISHA, Obu (JP)

(72) Inventors: Masanobu Shinagawa, Nagoya (JP); Hiroaki Kitanaga, Obu (JP); Rina Kondo, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/428,771

(22) PCT Filed: Feb. 6, 2020

(86) PCT No.: PCT/JP2020/004631
§ 371 (c)(1),
(2) Date: Aug. 5, 2021

(87) PCT Pub. No.: WO2020/162558
PCT Pub. Date: Aug. 13, 2020

(65) Prior Publication Data
US 2022/0106930 A1    Apr. 7, 2022

(30) Foreign Application Priority Data
Feb. 8, 2019   (JP) .............................. JP2019-021910

(51) Int. Cl.
*F02M 33/02*   (2006.01)
*F02M 25/08*   (2006.01)
(Continued)

(52) U.S. Cl.
CPC ..... *F02M 25/0854* (2013.01); *B01D 53/0415* (2013.01); *B01D 53/0446* (2013.01);
(Continued)

(58) Field of Classification Search
CPC ................ F02D 41/003; F02D 41/222; F02D 2041/223; F02D 2200/0602
See application file for complete search history.

(56) References Cited

U.S. PATENT DOCUMENTS 9,475,032 B2    10/2016   Watanabe et al.
10,309,326 B2    6/2019   Omichi et al.
(Continued)

FOREIGN PATENT DOCUMENTS

JP    2006-299849 A    11/2006
JP    2015-067749 A     4/2015
(Continued)

OTHER PUBLICATIONS

International Search Report (ISR) for PCT/JP2020/004631 dated Apr. 7, 2020 (7 pages total including English translation).
(Continued)

*Primary Examiner* — John Kwon
(74) *Attorney, Agent, or Firm* — Shumaker, Loop & Kendrick, LLP (57) ABSTRACT

An evaporated fuel processing device may include a flow passage through which evaporated fuel generated in a fuel tank flows; a first adsorbent constituted of activated carbon and arranged in the flow passage for adsorbing the evaporated fuel flowing in the flow passage; and a second adsorbent constituted of a porous metal complex and arranged in the flow passage on a downstream side of the first adsorbent for adsorbing the evaporated fuel having passed through the first adsorbent and flowing in the flow passage on the downstream side of the first adsorbent.

7 Claims, 6 Drawing Sheets

(51) Int. Cl.
   *B01D 53/04* (2006.01)
   *B01J 20/20* (2006.01)
   *B01J 20/22* (2006.01)

(52) U.S. Cl.
   CPC ............ *B01J 20/20* (2013.01); *B01J 20/226* (2013.01); *B01D 2253/102* (2013.01); *B01D 2253/1122* (2013.01); *B01D 2257/702* (2013.01); *B01D 2259/4516* (2013.01); *B01J 2220/42* (2013.01); *B01J 2220/44* (2013.01); *B01J 2220/66* (2013.01)

(56) References Cited

U.S. PATENT DOCUMENTS

| | | | |
|---|---|---|---|
| 2005/0132888 A1 | 6/2005 | Wolff | |
| 2009/0025694 A1* | 1/2009 | Shinagawa | F02M 25/0836 123/519 |
| 2011/0011264 A1* | 1/2011 | Makino | F02M 25/0872 96/144 |
| 2013/0037006 A1* | 2/2013 | Kosugi | F02M 25/0854 123/520 |
| 2015/0090226 A1 | 4/2015 | Dolan et al. | |
| 2018/0195445 A1* | 7/2018 | Iriyama | F02M 25/0854 |
| 2019/0024232 A1 | 1/2019 | Kosugi et al. | |
| 2020/0318579 A1* | 10/2020 | Honda | F02M 25/089 |
| 2021/0270216 A1* | 9/2021 | Kitanaga | F02M 25/0872 |
| 2021/0317804 A1* | 10/2021 | Kitanaga | F02M 25/0854 |
| 2021/0388796 A1* | 12/2021 | Miyabe | F02M 25/089 |
| 2022/0042468 A1* | 2/2022 | Miyabe | F02D 41/222 |
| 2022/0065731 A1* | 3/2022 | Miyabe | G01M 3/2876 |

FOREIGN PATENT DOCUMENTS

| | | |
|---|---|---|
| JP | 2015-203084 A | 11/2015 |
| JP | 2018-096309 A | 6/2018 |
| JP | 2019-021910 A | 2/2019 |
| WO | 2015/012068 A1 | 1/2015 |
| WO | 2015/012396 A1 | 1/2015 |

OTHER PUBLICATIONS

Written Opinion for PCT/JP2020/004631 dated Apr. 7, 2020 (7 pages).

* cited by examiner

EVAPORATED FUEL PROCESSING DEVICE

TECHNICAL FIELD

The art disclosed herein relates to an evaporated fuel processing device.

BACKGROUND ART

Patent Literature 1 describes an evaporated fuel processing device. The evaporated fuel processing device of Patent Literature 1 includes a flow passage through which evaporated fuel generated in a fuel tank flows, and an adsorbent constituted of activated carbon and arranged in the flow passage for adsorbing the evaporated fuel flowing in the flow passage.

CITATION LIST

Patent Literature 1: Japanese Patent Application Publication No. 2018-096309

SUMMARY OF INVENTION

Technical Problem

In the evaporated fuel processing device of Patent Literature 1, the adsorbent constituted of the activated carbon may not be able to sufficiently process the evaporated fuel. Due to this, gas containing a large amount of the evaporated fuel may be discharged to open air. The disclosure herein provides art for sufficiently processing evaporated fuel.

Solution to Technical Problem

An evaporated fuel processing device disclosed herein comprises a flow passage through which evaporated fuel generated in a fuel tank flows; a first adsorbent constituted of activated carbon and arranged in the flow passage for adsorbing the evaporated fuel flowing in the flow passage; and a second adsorbent constituted of a porous metal complex and arranged in the flow passage downstream of the first adsorbent for adsorbing the evaporated fuel having flowed through the first adsorbent and flowing in the flow passage downstream of the first adsorbent.

According to this configuration, the evaporated fuel can be adsorbed by the first adsorbent constituted of the activated carbon. Further, the evaporated fuel having flowed through the first adsorbent can be adsorbed by the second adsorbent constituted of the porous metal complex. By adsorbing the evaporated fuel firstly by the activated carbon and thereafter adsorbing the evaporated fuel by the porous metal complex having a different adsorption ability from the activated carbon, the evaporated fuel generated in the fuel tank can sufficiently be processed.

The second adsorbent may be arranged on a downstream-most side among a plurality of adsorbents arranged in the flow passage for adsorbing the evaporated fuel flowing in the flow passage.

According to this configuration, the evaporated fuel can be adsorbed by the porous metal complex at a position on the downstream-most side closest to open air. Due to this, the evaporated fuel can sufficiently be processed.

The porous metal complex may have a property in which an amount of adsorption of the evaporated fuel increases when a concentration of at least one type of hydrocarbon contained in the evaporated fuel to be adsorbed among hydrocarbons having 4 or less carbon atoms becomes equal to or higher than a gate-opening concentration. The gate-opening concentration may be 2.5 vol % or lower in an atmospheric pressure environment and a temperature environment of 20° C. or higher and 40° C. or lower.

According to this configuration, since the gate-opening concentration at which the amount of adsorption of the evaporated fuel increases in the porous metal complex is adjusted to an appropriate concentration, the evaporated fuel can sufficiently be adsorbed by the porous metal complex, and an amount of the hydrocarbons discharged into the open air can be reduced.

The porous metal complex may have a property in which an amount of adsorption of the evaporated fuel becomes greater when a concentration of at least one type of hydrocarbon contained in the evaporated fuel to be adsorbed among hydrocarbons having 4 or less carbon atoms is higher. In an atmospheric pressure environment and a temperature environment of 20° C. or higher and 40° C. or lower, the amount of adsorption of the evaporated fuel may be 0.50 g/dL or lower when the concentration of the at least one type of hydrocarbon is 0.050 vol % or lower, and the amount of adsorption of evaporated fuel is 2.0 g/dL or higher when the concentration of the at least one type of hydrocarbon is 5.0 vol % or higher.

According to this configuration as well, the evaporated fuel can sufficiently be adsorbed by the porous metal complex, and the amount of the hydrocarbon discharged into the open air can be reduced.

In a DBL test over two days and two nights, a total weight of the at least one type of hydrocarbons contained in the evaporated fuel that has flowed through the second adsorbent and flows in the flow passage downstream of the second adsorbent may be 20 mg or lower.

According to this configuration, the amount of the hydrocarbons discharged into the open air can be reduced. Strict standard of the DBL test can be satisfied.

The evaporated fuel processing device may further comprise a casing comprising a first chamber in which the first adsorbent is housed and a second chamber in which the second adsorbent is housed.

According to this configuration, the first and second adsorbents can both be housed in a single casing, thus the configuration of the evaporated fuel processing device can be simple.

DETAILED DESCRIPTION

First Embodiment

Figure 1:
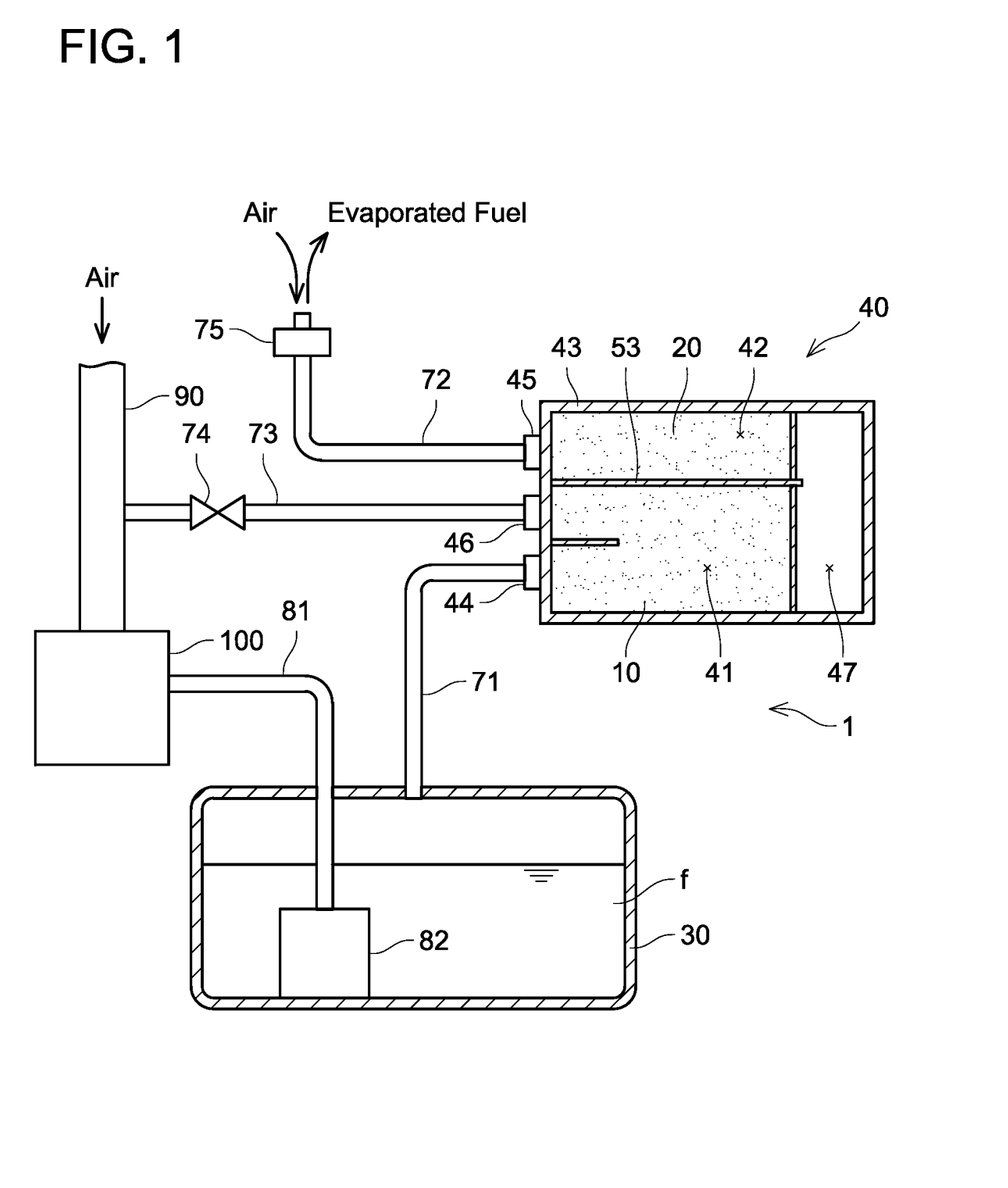
FIG. 1 schematically shows an evaporated fuel processing device according to an embodiment.

An evaporated fuel processing device 1 according to an embodiment will be described with reference to the drawings. FIG. 1 schematically shows the evaporated fuel processing device 1 according to the first embodiment. As shown in FIG. 1, the evaporated fuel processing device 1 includes a fuel tank 30 and a canister 40. Further, the evaporated fuel processing device 1 also includes a tank passage 71, an open air passage 72, and a purge passage 73. The evaporated fuel processing device 1 shown in FIG. 1 is mounted in a vehicle such as a gasoline-fueled vehicle.

The fuel tank 30 is configured to store fuel f such as gasoline. The fuel f is poured into the fuel tank 30 from an inlet (not shown). The fuel f in the fuel tank 30 contains hydrocarbons. For example, the fuel f contains at least one type of hydrocarbon (such as butane) among hydrocarbons having 4 or less carbon atoms (methane, ethane, propane, butane). The fuel f in the fuel tank 30 may contain hydrocarbon having 5 or more carbon atoms. The fuel f in the fuel tank 30 contains one type or two types or more of hydrocarbons.

A fuel pump 82 is disposed in the fuel tank 30. A fuel passage 81 is connected to the fuel pump 82. The fuel pump 82 is configured to discharge the fuel f in the fuel tank 30 to the fuel passage 81. The fuel f discharged into the fuel passage 81 is supplied to an engine 100 of the vehicle through the fuel passage 81.

The fuel f in the fuel tank 30 may evaporate within the fuel tank 30. For example, the fuel f may evaporate while the vehicle in which the evaporated fuel processing device 1 is mounted is traveling. The fuel f may also evaporate during when the vehicle in which the evaporated fuel processing device 1 is mounted is parked. Evaporated fuel is generated in the fuel tank 30 by the fuel f evaporating in the fuel tank 30.

An upstream end of the tank passage 71 is connected to the fuel tank 30. Gas that contains the evaporated fuel generated in the fuel tank 30 flows into the tank passage 71. A downstream end of the tank passage 71 is connected to the canister 40. The gas having flowed through the tank passage 71 flows into the canister 40. The tank passage 71 guides the gas containing the evaporated fuel generated in the fuel tank 30 from the fuel tank 30 to the canister 40. In the disclosure herein, description is made considering a side where the fuel tank 30 is as an upstream side and the opposite side from the fuel tank 30 (open air side) as a downstream side.

Figure 2:
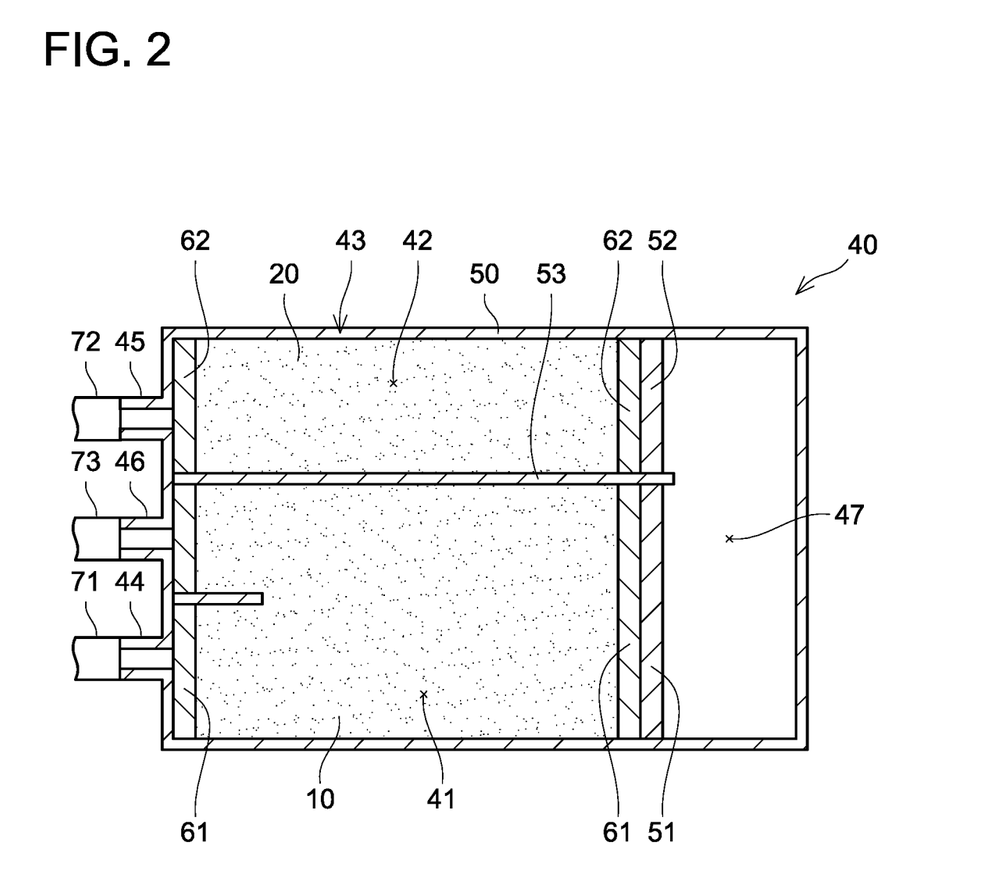
FIG. 2 shows a cross-sectional view of a canister according to the embodiment.

Next, the canister 40 will be described. FIG. 2 is a cross-sectional view of the canister 40 of the embodiment. As shown in FIG. 2, the canister 40 includes a casing 43 and a plurality of ports (a tank port 44, an open air port 45, and a purge port 46). The casing 43 and the plurality of ports (the tank port 44, the open air port 45, and the purge port 46) are constituted of resin. The casing 43 is integral with the plurality of ports (the tank port 44, the open air port 45, and the purge port 46).

The casing 43 includes a casing body 50 and a partitioning wall 53. The casing body 50 is integral with the partitioning wall 53. The partitioning wall 53 is disposed in the casing body 50. The partitioning wall 53 partitions a space inside the casing body 50. A first chamber 41 and a second chamber 42 are defined within the casing body 50 by the space in the casing body 50 being partitioned by the partitioning wall 53. A first adsorbent 10 is housed in the first chamber 41. A second adsorbent 20 is housed in the second chamber 42. The first adsorbent 10 and the second adsorbent 20 will be explained later in detail.

The first chamber 41 is located upstream of (on the fuel tank 30 side relative to) the second chamber 42 (see FIG. 1). A first porous plate 51 and a pair of first filters 61 are disposed in the first chamber 41. The first porous plate 51 is arranged at a downstream end of the first chamber 41. A plurality of pores (not shown) is formed in the first porous plate 51. Gas flowing in the first chamber 41 flows through the plurality of pores formed in the first porous plate 51. The first filters 61 are arranged at upstream and downstream ends of the first chamber 41, respectively. The first adsorbent 10 is interposed between the pair of first filters 61. The first filters 61 are configured to remove foreign matters contained in the gas flowing in the first chamber 41.

The second chamber 42 is located downstream of (on the opposite side from the fuel tank 30 (open air side) relative to) the first chamber 41 (see FIG. 1). A second porous plate 52 and a pair of second filters 62 are disposed in the second chamber 42. The second porous plate 52 is arranged at an upstream end of the second chamber 42. A plurality of pores (not shown) is formed in the second porous plate 52. Gas flowing in the second chamber 42 flows through the plurality of pores formed in the second porous plate 52. The second filters 62 are arranged at upstream and downstream ends of the second chamber 42, respectively. The second adsorbent 20 is interposed between the pair of second filters 62. The second filters 62 are configured to remove foreign matters contained in the gas flowing in the second chamber 42.

An intermediate chamber 47 is defined between the first chamber 41 and the second chamber 42. The intermediate chamber 47 is defined in the casing body 50 by the space in the casing body 50 being partitioned by the first porous plate 51 and the second porous plate 52.

The tank port 44 of the canister 40 is located adjacent to the first chamber 41 of the casing 43. The tank port 44 is in communication with the first chamber 41. The downstream end of the tank passage 71 is connected to the tank port 44. The tank passage 71 is in communication with the first chamber 41 through the tank port 44. The gas having flowed through the tank passage 71 flows into the first chamber 41 through the tank port 44.

The open air port 45 of the canister 40 is located adjacent to the second chamber 42 of the casing 43. The open air port 45 is in communication with the second chamber 42. An upstream end of the open air passage 72 is connected to the open air port 45. The second chamber 42 is in communication with the open air passage 72 through the open air port 45. The gas having flowed through the second chamber 42 flows into the open air passage 72 through the open air port 45.

A downstream end of the open air passage 72 is open to open air (see FIG. 1). The gas having flowed through the open air passage 72 is discharged to the open air. When the evaporated fuel is desorbed (which will be described later), air from the open air flows into the open air passage 72 from the downstream end of the open air passage 72. The air having flowed into the open air passage 72 flows through the open air passage 72 into the second chamber 42 of the casing 43 through the open air port 45. An air filter 75 is disposed on the open air passage 72. The air filter 75 is configured to remove foreign matters contained in the air flowing into the open air passage 72.

The purge port 46 of the canister 40 is located adjacent to the first chamber 41 of the casing 43. The purge port 46 is in communication with the first chamber 41. An upstream end of the purge passage 73 is connected to the purge port 46. The first chamber 41 is in communication with the purge passage 73 through the purge port 46. The gas having flowed through the first chamber 41 flows into the purge passage 73 through the purge port 46.

A downstream end of the purge passage 73 is connected to an intake passage 90. The gas having flowed through the purge passage 73 flows into the intake passage 90. A valve 74 is disposed on the purge passage 73. The valve 74 is configured to open and close the purge passage 73. When the valve 74 is in an opened state, gas flows through the purge passage 73. A pump (not shown) may be disposed on the purge passage 73.

An upstream end of the intake passage 90 is open to the open air. Air from the open air flows into the intake passage 90. A downstream end of the intake passage 90 is connected to the engine 100 of the vehicle. The air having flowed through the intake passage 90 flows into the engine 100.

Next, the first adsorbent 10 and the second adsorbent 20 will be described. The first adsorbent 10 is set in the first chamber 41. The first adsorbent 10 is constituted of active carbon. The active carbon constituting the first adsorbent 10 has an ability to adsorb the evaporated fuel. While the gas containing the evaporated fuel is flowing through the first adsorbent 10, a part of the evaporated fuel in the gas is adsorbed by the active carbon. Further, while air is flowing through the first adsorbent 10, the evaporated fuel adsorbed on the active carbon is desorbed into the air from the active carbon (i.e., the evaporated fuel is purged). The active carbon may, for example, be in the form of pellets or monolith. Granulated carbon or crushed carbon may be used as the active carbon, for example. Coal-based or wood-based active carbon may be used as the active carbon, for example.

The second adsorbent 20 is set in the second chamber 42. The second adsorbent 20 is constituted of a porous metal complex. The porous metal complex constituting the second adsorbent 20 has an ability to adsorb the evaporated fuel. While the gas containing the evaporated fuel is flowing through the second adsorbent 20, a part of the evaporated fuel in the gas is adsorbed by the porous metal complex. Further, while air is flowing through the second adsorbent 20, the evaporated fuel adsorbed on the porous metal complex is desorbed into the air from the porous metal complex (i.e., the evaporated fuel is purged). For example, the porous metal complex may be in the form of pellets or monolith, or may be in the form of a thin film in which the porous metal complex is applied on a substrate with air permeability.

Figure 3:
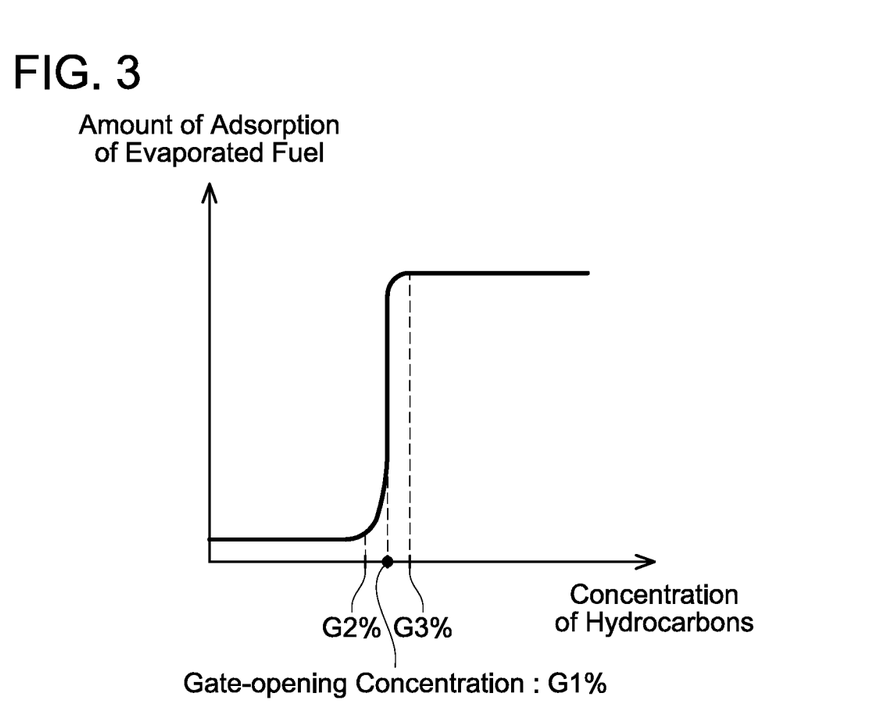
FIG. 3 is a graph showing an example of an amount of adsorption of evaporated fuel by a porous metal complex of a first embodiment.

FIG. 3 is a graph showing an example of an amount of adsorption of the evaporated fuel in the porous metal complex constituting the second adsorbent 20. As shown in FIG. 3, the porous metal complex constituting the second adsorbent 20 has a property in which the amount of adsorption of the evaporated fuel increases significantly when a concentration of at least one type of hydrocarbon (such as butane) contained in the evaporated fuel to be adsorbed among hydrocarbons having 4 or less carbon atoms (methane, ethane, propane, butane) becomes equal to or higher than a gate-opening concentration. In the example shown in FIG. 3, the amount of adsorption of the evaporated fuel in the porous metal complex increases significantly when the concentration of the hydrocarbons (such as butane) becomes G1% or more. G1% is the gate-opening concentration. One of concentrations between G2% and G3% shown in FIG. 3 may be set as the gate-opening concentration.

When the concentration of at least one type of hydrocarbon contained in the evaporated fuel to be adsorbed among the hydrocarbons having 4 or less carbon atoms becomes equal to or higher than the gate-opening concentration, structures of micropores thereby change and the porous metal complex shifts to a gate-opening state. When the porous metal complex shifts to the gate-opening state, the structures and sizes of the micropores in a framework thereof change due to external stimuli generated when the evaporated fuel is adsorbed in the micropores. The external stimuli may for example be chemical stimuli or physical stimuli. Upon the porous metal complex entering the gate-open state, the ability of the porous metal complex to adsorb the evaporated fuel increases significantly.

The gate-opening concentration of the porous metal complex constituting the second adsorbent 20 is 2.5 vol % or lower in an atmospheric pressure environment and a temperature environment of 20° C. or higher and 40° C. or lower. In the example shown in FIG. 3, G1=2.5. The atmospheric pressure environment may for example be 85 kPa to 101.3 kPa.

The gate-opening concentration of the porous metal complex may for example be determined by obtaining a relationship between the concentration of the hydrocarbons (such as butane) contained in the evaporated fuel and the amount of adsorption of the evaporated fuel in the porous metal complex. For example, the gate-opening concentration can be determined by sequentially changing the concentration of the hydrocarbons (such as butane) contained in the evaporated fuel and measuring the amount of adsorption of the evaporated fuel for each concentration level. The hydrocarbon concentration at which the amount of adsorption of the evaporated fuel in the porous metal complex increases significantly is the gate-opening concentration. In a range equal to or higher than the gate-opening concentration, the amount of adsorption of the evaporated fuel in the porous metal complex increases significantly as compared to a range that is less than the gate-opening concentration. For example, the amount of adsorption of the evaporated fuel triples. A method for determining the gate-opening concentration is not particularly limited.

The porous metal complex constituting the second adsorbent 20 may contain at least one type of metal ion selected from metal ions belonging to groups 1 to 13 in periodic table and an anionic ligand. The metal ions belonging to the groups 1 to 13 in the periodic table used in the porous metal complex may for example be manganese ion, cobalt ion, nickel ion, copper ion, and zinc ion. The anionic ligand used in the porous metal complex may for example be selected from the group consisting of aliphatic monocarboxylate ion, aromatic monocarboxylate ion, heteroaromatic monocarboxylate ion, aliphatic dicarboxylate ion, aromatic dicarboxylate ion, heteroaromatic dicarboxylate ion, aromatic tricarboxylate ion, and aromatic tetracarboxylate ion.

Next, operation of the evaporated fuel processing device 1 will be described. Firstly, adsorption of the evaporated fuel will be described. In the aforementioned evaporated fuel processing device 1, the gas containing the evaporated fuel generated from the fuel f in the fuel tank 30 flows from the fuel tank 30 into the tank passage 71. The gas containing the evaporated fuel having flowed in the tank passage 71 flows into the first chamber 41 in the casing body 50 through the tank port 44 of the canister 40. The gas containing the evaporated fuel having flowed into the first chamber 41 flows through the first adsorbent 10 housed in the first chamber 41 into the intermediate chamber 47. While the gas containing the evaporated fuel is flowing through the first adsorbent 10, the first adsorbent 10 adsorbs a part of the evaporated fuel in the gas. The evaporated fuel is adsorbed on the active carbon constituting the first adsorbent 10. The evaporated fuel that was not adsorbed by the active carbon flows from the first chamber 41 into the intermediate chamber 47.

The gas containing the evaporated fuel having flowed into the intermediate chamber 47 through the first adsorbent 10 flows into the second chamber 42. The gas containing the evaporated fuel having flowed into the second chamber 42 flows through the second adsorbent 20 housed in the second chamber 42 into the open air passage 72 through the open air port 45. While the gas containing the evaporated fuel is flowing through the second adsorbent 20, the second adsorbent 20 adsorbs a part of the evaporated fuel in the gas. The evaporated fuel is adsorbed on the porous metal complex constituting the second adsorbent 20. The evaporated fuel that was not adsorbed by the porous metal complex flows from the second chamber 42 into the open air passage 72.

The gas containing the evaporated fuel having flowed into the open air passage 72 through the second adsorbent 20 is discharged into the open air. The evaporated fuel that was not adsorbed by the first adsorbent 10 (active carbon) nor the second adsorbent 20 (porous metal complex) is discharged to the open air.

Next, desorbing of the evaporated fuel will be described. In the above evaporated fuel processing device 1, gas can flow through the purge passage 73 when the valve 74 on the purge passage 73 is in the opened state. Further, when the engine 100 of the vehicle in which the evaporated fuel processing device 1 is mounted starts to operate, air flowing in the intake passage 90 is suctioned into the engine 100 and a negative pressure is applied in the intake passage 90. Thereby, the gas flows from the purge passage 73 into the intake passage 90. Along with this, air from the open air flows into the open air passage 72. The air having flowed into the open air passage 72 flows into the second chamber 42 in the casing body 50 through the open air port 45 of the canister 40. The air having flowed through the second chamber 42 flows through the second adsorbent 20 housed in the second chamber 42 into the intermediate chamber 47. While the air is flowing through the second adsorbent 20, the evaporated fuel adsorbed on the second adsorbent 20 is desorbed from the second adsorbent 20 into the air. That is, the evaporated fuel is purged. The air containing the purged evaporated fuel flows from the second chamber 42 into the intermediate chamber 47.

The air containing the purged evaporated fuel having flowed into the intermediate chamber 47 flows into the first chamber 41. The air having flowed into the first chamber 41 flows through the first adsorbent 10 housed in the first chamber 41 into the purge passage 73 through the purge port 46. While the air is flowing through the first adsorbent 10, the evaporated fuel adsorbed on the first adsorbent 10 is desorbed from the first adsorbent 10 to the air. That is, the evaporated fuel is purged. The air containing the purged evaporated fuel flows from the first chamber 41 into the purge passage 73.

The air containing the evaporated fuel having flowed into the purge passage 73 flows through the purge passage 73 into the intake passage 90. The air containing the evaporated fuel having flowed into the intake passage 90 is suctioned into the engine 100.

Next, a Diurnal Breathing Loss (DBL) test will be described. The DBL test is a test for measuring a total weight of hydrocarbons contained in the evaporated fuel discharged into the open air while the vehicle in which the evaporated fuel processing device 1 is mounted is parked over one day and one night.

In the present test, the total weight of the hydrocarbons contained in the evaporated fuel discharged to the open air was measured in regard to the evaporated fuel processing device 1 assuming that the vehicle is parked over two days and two nights. That is, the DBL test was performed over two days and two nights.

(Test Condition)

In the DBL test, activated carbon having butane working capacity (BWC) of 11.5 g/dl was used as the activated carbon constituting the first adsorbent 10 in the evaporated fuel processing device 1. A volume of the activated carbon was set to 2500 cc.

As aforementioned, the porous metal complex constituting the second adsorbent 20 in the evaporated fuel processing device 1 has the property in which the amount of adsorption increases when the concentration of at least one type of hydrocarbon contained in the evaporated fuel to be adsorbed among the hydrocarbons having 4 or less carbon atoms becomes equal to or higher than the gate-opening concentration. In the DBL test, porous metal complexes as in experiment examples 1 to 4 were used. When the porous metal complex of the experiment example 1 was used, the gate-opening concentration was set to 1.5 vol %. When the porous metal complex of the experiment example 2 was used, the gate-opening concentration was set to 2.0 vol %. When the porous metal complex of the experiment example 3 was used, the gate-opening concentration was set to 2.5 vol %. When the porous metal complex of the experiment example 4 was used, the gate-opening concentration was set to 3.0 vol %. The gate-opening concentrations in the experiment examples 1 to 4 are values that were measured in the atmospheric pressure environment and the temperature environment of 20° C. or higher and 40° C. or lower. The gate-opening concentrations in the present test were set to values that were measured based on a butane concentration. Volumes of the porous metal complexes in the experiment examples 1 to 4 were set to 100 cc.

In the present test, firstly (1) evaporated fuel was adsorbed on the first adsorbent 10 and the second adsorbent 20, and then the first adsorbent 10 and the second adsorbent 20 were brought to a breakthrough state. Then, (2) air in a volume (250000 cc) 100 times the volume (2500 cc) of the activated carbon constituting the first adsorbent 10 was fed through the open air passage 72, the second chamber 42, the first chamber 41, and the purge passage 73. The evaporated fuel that was adsorbed on the first adsorbent 10 and the second adsorbent 20 was thereby purged.

Then, (3) the DBL test was carried out over two days and two nights. In the DBL test over two days and two nights, the total weight of the hydrocarbons contained in the evaporated fuel flowing in the open air passage 72 downstream of the second adsorbent 20 was measured assuming that the vehicle is parked over two days and two nights. When the vehicle is parked over two days and two nights, the fuel f in the fuel tank 30 evaporates due to external temperatures over the two days and two nights and the evaporated fuel is thereby generated. A part of the evaporated fuel generated in the fuel tank 30 is adsorbed by the first adsorbent 10 and the second adsorbent 20 while the evaporated fuel is flowing through the first adsorbent 10 and the second adsorbent 20. The evaporated fuel that was not adsorbed by the first adsorbent 10 or the second adsorbent 20 flows through the second adsorbent 20, flows in the open air passage 72 downstream of the second adsorbent 20, and is discharged into the open air from the open air passage 72. In the DBL test over two days and two nights, the total weight of the hydrocarbons contained in the evaporated fuel discharged from the open air passage 72 into the open air during those two days and two nights can be measured. The total weight of the hydrocarbons contained in the evaporated fuel discharged into the open air during those two days and two nights was measured for each of the cases where the porous metal complexes of the experiment examples 1 to 4 are used.

In the vehicle in which the evaporated fuel processing device is mounted, it is desirable that less amount of hydrocarbons contained in the evaporated fuel is discharged into the open air. Under criteria for clean vehicles in the state of California of the United States, the total weight of hydrocarbons contained in the evaporated fuel discharged into the open air in the DBL test over two days and two nights may be limited to 20 mg or less.

(Test Result)

Figure 4:
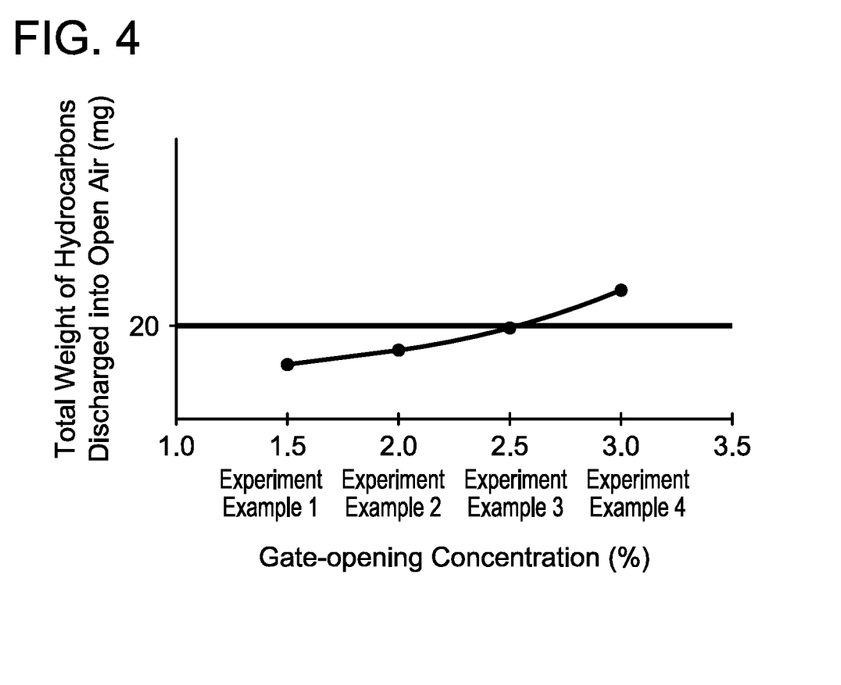
FIG. 4 is a graph showing a total weight of hydrocarbons contained in evaporated fuel flowing through an open air passage downstream of a second adsorbent (that is, evaporated fuel to be discharged to open air from the open air passage) when porous metal complexes of experiment examples 1 to 4 are used.

FIG. 4 is a graph showing the total weight of the hydrocarbons contained in the evaporated fuel that flows in the open air passage 72 downstream of the second adsorbent 20 (that is, in the evaporated fuel to be discharged from the open air passage 72 into the open air) in the DBL test over two days and two nights. The graph shown in FIG. 4 shows the total weight of hydrocarbons when the porous metal complexes of the experiment examples 1 to 4 are used. As shown in FIG. 4, when the porous metal complexes of the experiment examples 1 to 3 are used, the total weight of the hydrocarbons contained in the evaporated fuel discharged from the open air passage 72 into the open air is 20 mg or less. When the porous metal complex of the experiment example 4 is used, the total weight of the hydrocarbons contained in the evaporated fuel discharged from the open air passage 72 into the open air exceeds 20 mg.

The evaporated fuel processing device 1 using one of the porous metal complexes of the experiment examples 1 to 3 has the total weight of hydrocarbons contained in the evaporated fuel (evaporated fuel that flowed through the second adsorbent 20 and flows in the open air passage 72 downstream of the second adsorbent 20) of 20 mg or less in the DBL test over two days and two nights. When the porous metal complexes of the experiment examples 1 to 3 are used, the criteria for clean vehicles in the state of California of the United States can be satisfied.

The evaporated fuel processing device 1 of the embodiment has been described above. As it is apparent from the foregoing description, the evaporated fuel processing device 1 includes the first adsorbent 10 constituted of the activated carbon disposed in the first chamber 41 for adsorbing the evaporated fuel that flows in the first chamber 41. Further, the evaporated fuel processing device 1 includes the second adsorbent 20 constituted of the porous metal complex disposed in the second chamber 42 for adsorbing the evaporated fuel that has flowed through the first adsorbent 10 and flows in the second chamber 42 downstream of the first adsorbent 10.

According to this configuration, the evaporated fuel can be adsorbed by the first adsorbent 10 constituted of the activated carbon. Further, the evaporated fuel that passed through the first adsorbent 10 can be adsorbed by the second adsorbent 20 constituted of the porous metal complex. By adsorbing the evaporated fuel by the activated carbon on an upstream side of the flow passage and thereafter adsorbing the evaporated fuel by the porous metal complex having a different adsorption capability from the activated carbon on a downstream side of the flow passage, the evaporated fuel generated in the fuel tank 30 can sufficiently be processed. The amount of the evaporated fuel discharged into the open air can be reduced.

The porous metal complex constituting the second adsorbent 20 has the property in which the amount of adsorption increases when the concentration of the hydrocarbons (such as butane) contained in the evaporated fuel becomes equal to or higher than the gate-opening concentration. The gate-opening concentration is 2.5 vol % or lower in the atmospheric pressure environment and the temperature environment of 20° C. or higher and 40° C. or lower. According to this configuration, the gate-opening concentration with respect to the porous metal complex is optimized to a suitable concentration, by which the evaporated fuel can sufficiently be adsorbed by the porous metal complex and the amount of the hydrocarbons discharged into the open air can be reduced.

Further, in the evaporated fuel processing device 1 as above, the total weight of hydrocarbons contained in the evaporated fuel that flows in the open air passage 72 downstream of the second adsorbent 20 is 20 mg or less in the DBL test over two days and two nights. According to this configuration, the amount of the hydrocarbons discharged into the open air can be reduced. Strict criteria set in the DBL test can be satisfied.

Further, in the evaporated fuel processing device 1 as above, the casing 43 of the canister 40 includes the first chamber 41 in which the first adsorbent 10 is housed and the second chamber 42 in which the second adsorbent 20 is housed. According to this configuration, the first adsorbent 10 and the second adsorbent 20 can be housed in a single casing 43, thus the configuration of the evaporated fuel processing device 1 can be simple.

(Corresponding Relationship)

The tank passage 71, the first chamber 41, the second chamber 42, and the open air passage 72 are examples of a flow passage in which evaporated fuel flows.

While an embodiment has been described above, specific aspects are not limited to the above embodiment. In the following description, elements that are identical to those described in the foregoing description will be given the same reference signs and description thereof will be omitted.

Figure 5:
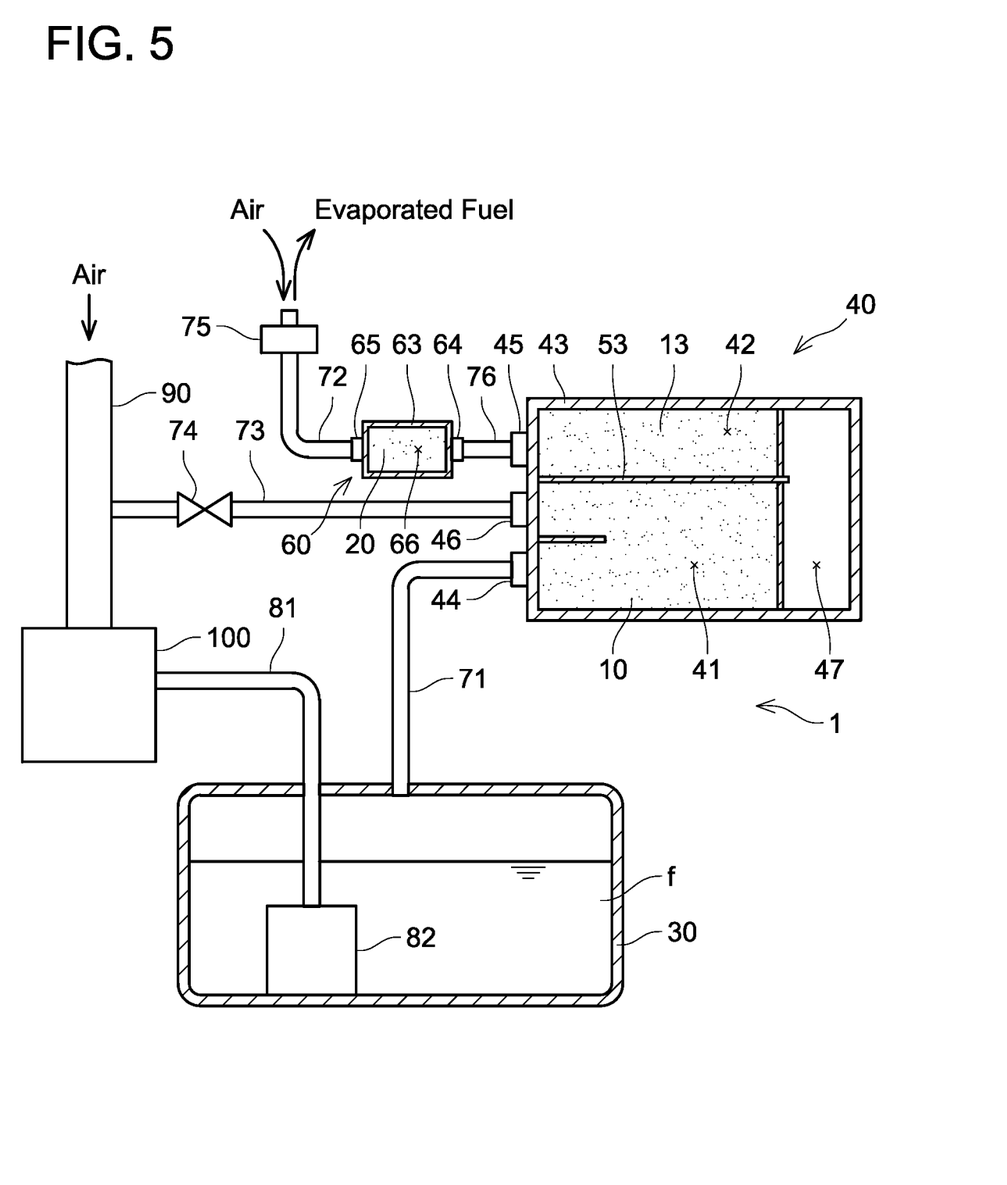
FIG. 5 is a schematic view of an evaporated fuel processing device of another embodiment.

In another embodiment, as shown in FIG. 5, the evaporated fuel processing device 1 may further include a downstream canister 60. The downstream canister 60 includes a casing 63 and a plurality of ports (canister port 64 and open air port 65). The casing 63 and the plurality of ports (canister port 64 and open air port 65) are constituted of resin. The casing 63 is integral with the plurality of ports (canister port 64 and open air port 65). A housing chamber 66 is defined in the casing 63. The second adsorbent 20 is housed in the housing chamber 66. A third adsorbent 13 is housed in the second chamber 42 of the canister 40 upstream of the downstream canister 60. The third adsorbent 13 is constituted of the same activated carbon as the first adsorbent 10. The second adsorbent 20 is arranged downstream of both the first adsorbent 10 and the third adsorbent 13. The second adsorbent 20 is arranged on a downstream-most side (open air side) among the plurality of adsorbents (first adsorbent 10, third adsorbent 13, and second adsorbent 20).

The canister port 64 of the downstream canister 60 is in communication with the housing chamber 66. Further, a downstream end of an intermediate passage 76 is connected to the canister port 64. The intermediate passage 76 and the housing chamber 66 are in communication with each other through the canister port 64. An upstream end of the intermediate passage 76 is connected to the open air port 45 of the upstream canister 40. The intermediate passage 76 and the second chamber 42 are in communication with each other through the open air port 45 of the upstream canister 40. The gas that flowed in the second chamber 42 of the upstream canister 40 flows into the intermediate passage 76 through the open air port 45. The gas having flowed in the intermediate passage 76 flows into the housing chamber 66 through the canister port 64 of the downstream canister 60.

The open air port 65 of the downstream canister 60 is in communication with the housing chamber 66. Further, the upstream end of the open air passage 72 is connected to the open air port 65. The housing chamber 66 and the open air passage 72 are in communication with each other through the open air port 65. The gas that has flowed in the housing chamber 66 flows into the open air passage 72 through the open air port 65.

In this configuration, while the gas containing the evaporated fuel flowing through the third adsorbent 13 housed in the second chamber 42 of the upstream canister 40, the third adsorbent 13 adsorbs a part of the evaporated fuel contained in the gas. The evaporated fuel is adsorbed on the activated carbon constituting the third adsorbent 13. The evaporated fuel that was not adsorbed by the activated carbon flows into the intermediate passage 76.

The gas containing the evaporated fuel that has flowed through the third adsorbent 13 and flowed into the intermediate passage 76 then flows into the housing chamber 66 of the downstream canister 60. The gas containing the evaporated fuel that has flowed into the housing chamber 66 flows through the second adsorbent 20 housed in the housing chamber 66, and flows into the open air passage 72 through the open air port 65. While the gas containing the evaporated fuel is flowing through the second adsorbent 20, the second adsorbent adsorbs a part of the evaporated fuel contained in the gas. The evaporated fuel is adsorbed in the porous metal complex constituting the second adsorbent 20. The evaporated fuel that was not adsorbed by the porous metal complex flows into the open air passage 72.

In the above configuration, the second adsorbent 20 is arranged on the downstream-most side among the plurality of adsorbents (first adsorbent 10, second adsorbent 20, and third adsorbent 13). According to this configuration, the evaporated fuel can be adsorbed by the porous metal complex at a position on the downstream-most side close to the open air. Due to this, the evaporated fuel can sufficiently be processed.

(Corresponding Relationship)

The tank passage 71, the first chamber 41, the second chamber 42, the intermediate passage 76, the housing chamber 66, and the open air passage 72 as above are examples of the flow passage in which the evaporated fuel flows.

Second Embodiment

In the first embodiment as above, the porous metal complex constituting the second adsorbent 20 is configured such that the amount of adsorption of the evaporated fuel increases when the concentration of the at least one type of hydrocarbon contained in the evaporated fuel to be adsorbed (such as butane) among the hydrocarbons having 4 or less carbon atoms becomes equal to or higher than the gate-opening concentration. The porous metal complex is not limited to this configuration.

Figure 6:
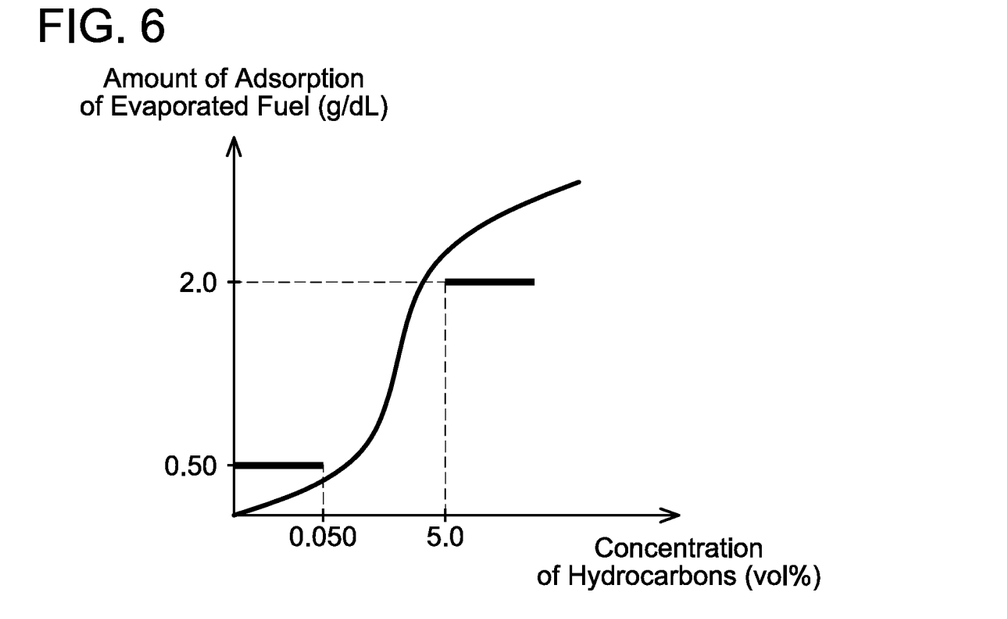
FIG. 6 is a graph showing an example of an amount of adsorption of evaporated fuel by a porous metal complex of a second embodiment.

In the second embodiment, the porous metal complex has a property in which the amount of adsorption of the evaporated fuel is larger when the concentration of at least one type of hydrocarbon contained in the evaporated fuel to be adsorbed among the hydrocarbons having 4 or less carbon atoms is higher. Further, as shown in FIG. 6, the porous metal complex of the second embodiment has the amount of adsorption of the evaporated fuel of 0.50 g/dL or lower when the concentration of the hydrocarbons is 0.050 vol % or lower, and has the amount of adsorption of the evaporated fuel of 2.0 g/dL or higher when the concentration of the hydrocarbons is 5.0 vol % or higher. The hydrocarbon concentration and the amount of adsorption of the evaporated fuel are values in the atmospheric pressure environment and in the temperature environment of 20° C. or higher and 40° C. or lower. The temperature environment may be any temperature from 20° C. to 40° C.

The porous metal complex of the second embodiment may for example be MIL-100(Cr), MIL-101(Cr), or UiO-67. MIL-100(Cr) may for example be $M_3O(F,OH)(BTC)_2$. MIL-101(Cr) may for example be $M_3O(F,OH)(BDC)_3$. UiO-67 may for example be $Zr_6O_4(OH)_4(BPDC)_6$ or $Zr_6O_6(BPDC)_6$.

An example of a method for preparing the porous metal complex will be described below. MIL-101(Cr) was prepared under a basic condition using tetramethylammonium hydroxide (TMAOH). 1 mmol of $H_2BDC$ (166 mg) was added to an alkaline solution (TMAOH, 5 mL, 0.05 mol/L) and the solution was stirred for 10 minutes at a room temperature. 1 mmol of $Cr(NO_3)_3$ $9H_2O$ (400 mg) was added to this solution and pH was maintained between 6.0 and 6.5. The reaction mixture was stirred for 20 minutes, moved to an autoclave lined with 23 mL of PTFE, and heated for 24 hours at a temperature of 180° C. It was then cooled gradually to the room temperature, and centrifugally separated over multiple times. Green powder resulted therefrom was collected and cleansed completely by using distilled water and methanol. MIL-101(Cr) is also called FMOF-1 or MIL-101. In MIL-101(Cr), a size of a structural unit Cluster Building Unit (CBU) having Cr at its center may for example be 6 to 7 Å.

(DBL Test)

Figure 7:
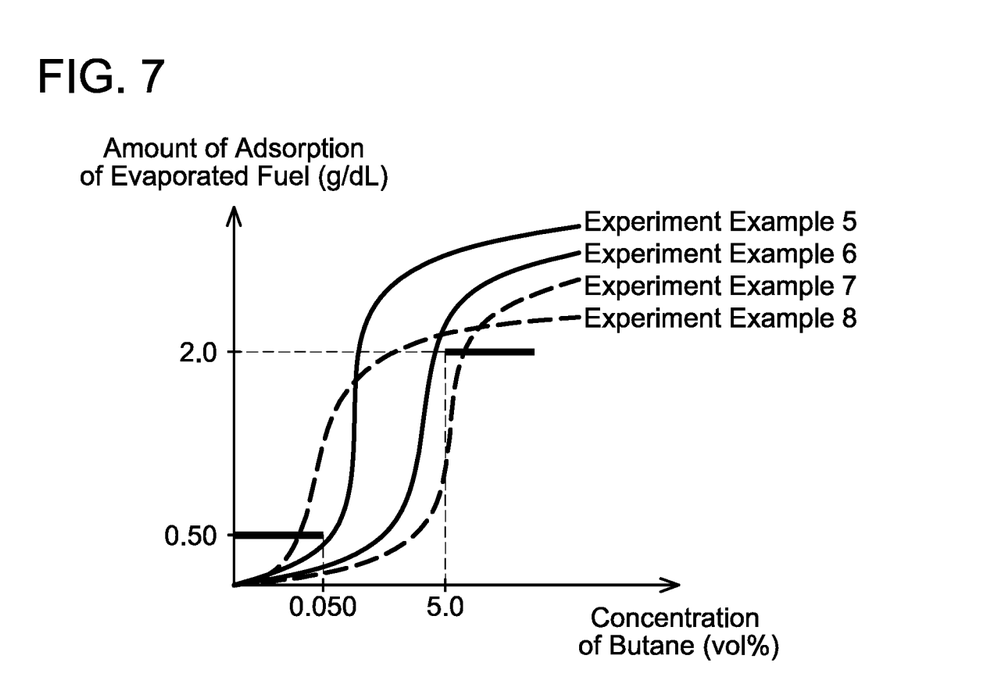
FIG. 7 is a graph showing an amount of adsorption of evaporated fuel by porous metal complexes of experiment examples 5 to 8.

The DBL test was carried out over two days and two nights using the porous metal complex of the second embodiment. In the DBL test in the second embodiment, porous metal complexes of experiment examples 5 to 8 were used. As shown in FIG. 7, the porous metal complexes of the experiment examples 5 and 6 have the amount of adsorption of the evaporated fuel of 0.50 g/dL or lower when the concentration of the hydrocarbons is 0.050 vol % or lower, and the amount of adsorption of the evaporated fuel of 2.0 g/dL or higher when the concentration of the hydrocarbons is 5.0 vol % or higher.

As shown in FIG. 7, the porous metal complex of the experiment example 7 has the amount of adsorption of the evaporated fuel of 0.50 g/dL or lower when the concentration of the hydrocarbons is 0.050 vol % or lower. Further, the porous metal complex of the experiment example 7 has the amount of adsorption of the evaporated fuel of less than 2.0 g/dL when the concentration of the hydrocarbons is a certain concentration from 5.0 vol % or higher.

As shown in FIG. 7, the porous metal complex of the experiment example 8 has the amount of adsorption of the evaporated fuel greater than 0.50 g/dL when the concentration of the hydrocarbons is 0.050 vol % or lower. Further, the porous metal complex of the experiment example 8 has the amount of adsorption of the evaporated fuel of 2.0 g/dL or more when the concentration of the hydrocarbons is 5.0 vol % or higher.

The hydrocarbon concentration and the amount of adsorption of the evaporated fuel in the experiment examples 5 to 8 are values measured under the atmospheric pressure environment and the temperature environment of 20° C. or higher and 40° C. or lower (25° C. in the present test). Values measured based on a butane concentration were used as the hydrocarbon concentration in the present test. Volume of each of the porous metal complexes of the experiment examples 5 to 8 was 100 cc. The other test conditions in the DBL test of the second embodiment were the same testing conditions as the DBL test of the first embodiment.

(Test Result)

Figure 8:
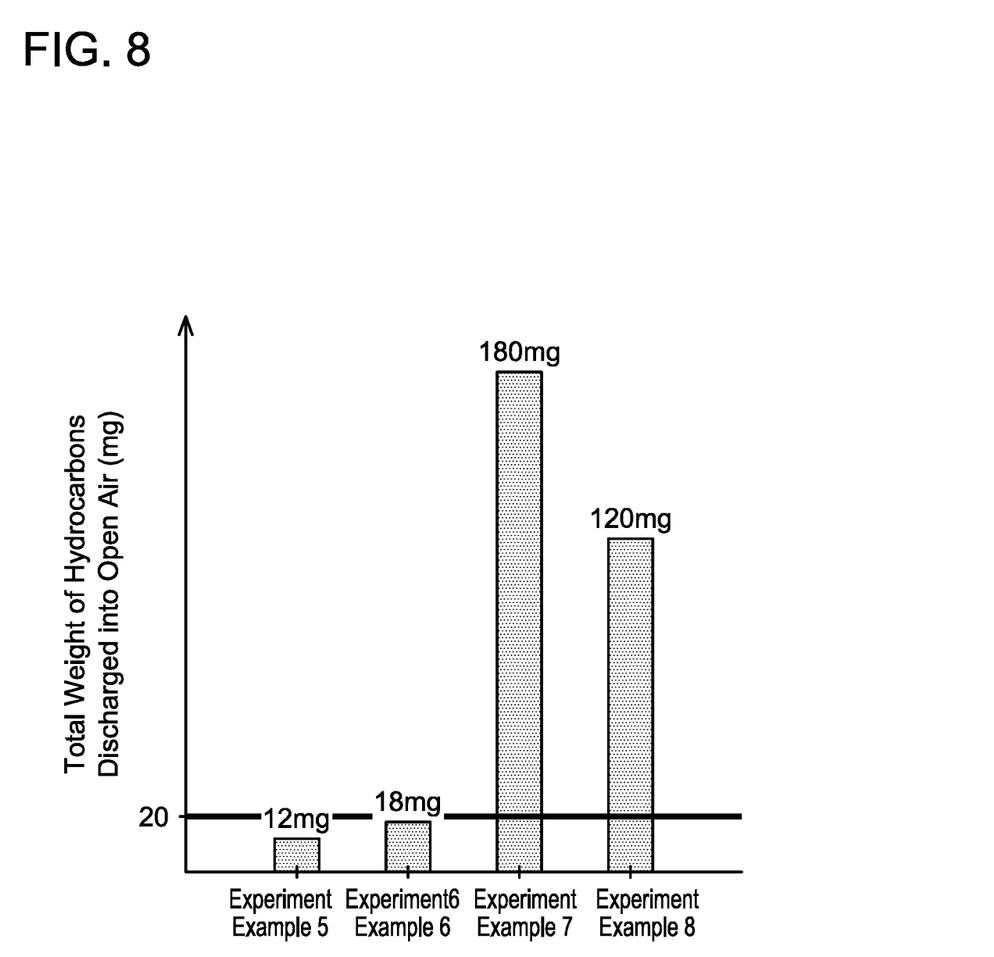
FIG. 8 is a graph showing a total weight of hydrocarbons contained in the evaporated fuel flowing through an open air passage downstream of a second adsorbent (that is, evaporated fuel to be discharged to open air from the open air passage) when the porous metal complexes as in the experiment examples 5 to 8 are used.

FIG. 8 is a graph showing the total weight of the hydrocarbons contained in the evaporated fuel that flows in the open air passage 72 downstream of the second adsorbent 20 (that is, in the evaporated fuel to be discharged from the open air passage 72 into the open air) in the evaporated fuel processing device 1 (see FIG. 1) in the DBL test over two days and two nights. The graph shown in FIG. 8 shows the total weight of the hydrocarbons when the porous metal complexes of the experiment examples 5 to 8 are used. As shown in FIG. 8, when the porous metal complexes of the experiment examples 5 and 6 are used, the total weight of the hydrocarbons contained in the evaporated fuel discharged from the open air passage 72 into the open air is 20 mg or less. Specifically, the total weight of the hydrocarbons is 12 mg in the experiment example 5 and 18 mg in the experiment example 6.

On the other hand, when the porous metal complexes of the experiment examples 7 and 8 are used, the total weight of the hydrocarbons contained in the evaporated fuel discharged from the open air passage 72 into the open air exceeds 20 mg. Specifically, the total weight of the hydrocarbons is 180 mg in the experiment example 7 and 120 mg in the experiment example 8.

The evaporated fuel processing device 1 using one of the porous metal complexes of the experiment examples 5 and 6 has the total weight of hydrocarbons contained in the evaporated fuel (evaporated fuel that flowed through the second adsorbent 20 and flows in the open air passage 72 downstream of the second adsorbent 20) of 20 mg or less in the DBL test over two days and two nights. When the porous metal complexes of the experiment examples 5 and 6 are used, the criteria for clean vehicles in the state of California of the United States can be satisfied.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

REFERENCE SIGNS LIST

1: evaporated fuel processing device, 10: first adsorbent, 13: third adsorbent, 20: second adsorbent, 30: fuel tank, 40: canister, 41: first chamber, 42: second chamber, 43: casing, 44: tank port, 45: open air port, 46: purge port, 47: intermediate chamber, 50: casing body, 51: first porous plate, 52: second porous plate, 53: partitioning wall, 60: downstream canister, 61: first filters, 62: second filters, 63: casing, 64: canister port, 65: open air port, 66: housing chamber, 71: tank passage, 72: open air passage, 73: purge passage, 74: valve, 75: air filter, 76: intermediate passage, 81: fuel passage, 82: fuel pump, 90: intake passage, 100: engine

The invention claimed is:

1. An evaporated fuel processing device comprising:
   a flow passage through which evaporated fuel generated in a fuel tank flows;
   a first adsorbent constituted of activated carbon and arranged in the flow passage for adsorbing the evaporated fuel flowing in the flow passage; and
   a second adsorbent constituted of a porous metal complex and arranged in the flow passage downstream of the first adsorbent for adsorbing the evaporated fuel having flowed through the first adsorbent and flowing in the flow passage downstream of the first adsorbent.

2. The evaporated fuel processing device according to claim 1, wherein
   the second adsorbent is arranged on a downstream-most side among a plurality of adsorbents arranged in the flow passage for adsorbing the evaporated fuel flowing in the flow passage.

3. The evaporated fuel processing device according to claim 1, wherein
   the porous metal complex has a property in which an amount of adsorption of the evaporated fuel increases when a concentration of at least one type of hydrocarbon contained in the evaporated fuel to be adsorbed among hydrocarbons having 4 or less carbon atoms becomes equal to or higher than a gate-opening concentration, and
   the gate-opening concentration is 2.5 vol % or lower in an atmospheric pressure environment and a temperature environment of 20° C. or higher and 40° C. or lower.

4. The evaporated fuel processing device according to claim 1, wherein
   the porous metal complex has a property in which an amount of adsorption of the evaporated fuel becomes greater when a concentration of at least one type of hydrocarbon contained in the evaporated fuel to be adsorbed among hydrocarbons having 4 or less carbon atoms is higher, and
   in an atmospheric pressure environment and a temperature environment of 20° C. or higher and 40° C. or lower, the amount of adsorption of the evaporated fuel is 0.50 g/dL or lower when the concentration of the at least one type of hydrocarbon is 0.050 vol % or lower, and the amount of adsorption of evaporated fuel is 2.0 g/dL or higher when the concentration of the at least one type of hydrocarbon is 5.0 vol % or higher.

5. The evaporated fuel processing device according to claim 3, wherein
   in a DBL test over two days and two nights, a total weight of the at least one type of hydrocarbon contained in the evaporated fuel that has flowed through the second adsorbent and flows in the flow passage downstream of the second adsorbent is 20 mg or lower.

6. The evaporated fuel processing device according to claim 1, further comprising:
   a casing comprising a first chamber in which the first adsorbent is housed and a second chamber in which the second adsorbent is housed.

7. The evaporated fuel processing device according to claim 4, wherein
in a DBL test over two days and two nights, a total weight of the at least one type of hydrocarbon contained in the evaporated fuel that has flowed through the second adsorbent and flows in the flow passage downstream of the second adsorbent is 20 mg or lower.

* * * * *